(12) United States Patent
Konrad et al.

(10) Patent No.: US 11,673,623 B2
(45) Date of Patent: Jun. 13, 2023

(54) MASTER CYLINDER

(71) Applicant: REKLUSE RACING LLC, Boise, ID (US)

(72) Inventors: Dayne H. Konrad, Boise, ID (US); Ian R. Shelman, Boise, ID (US); Karl E. Jensen, Boise, ID (US); Sean G. Brown, Boise, ID (US)

(73) Assignee: Rekluse Racing LLC, Boise, ID (US)

( * ) Notice: Subject to any disclaimer, the term of this patent is extended or adjusted under 35 U.S.C. 154(b) by 30 days.

(21) Appl. No.: 17/225,981

(22) Filed: Apr. 8, 2021

(65) Prior Publication Data

US 2021/0316815 A1 Oct. 14, 2021

Related U.S. Application Data

(60) Provisional application No. 63/007,162, filed on Apr. 8, 2020.

(51) Int. Cl.
*B62L 3/02* (2006.01)
*B60T 7/10* (2006.01)
*B60T 11/22* (2006.01)

(52) U.S. Cl.
CPC .............. *B62L 3/023* (2013.01); *B60T 7/102* (2013.01); *B60T 11/22* (2013.01)

(58) Field of Classification Search
CPC . F16H 59/36; B60T 7/102; B60T 7/10; B62K 19/38; B62L 3/023
See application file for complete search history.

(56) References Cited

U.S. PATENT DOCUMENTS

2013/0277162 A1\* 10/2013 Nago .................. B62L 3/023
188/344
2016/0257372 A1\* 9/2016 Nakai .................. B60T 11/22

\* cited by examiner

*Primary Examiner* — Abiy Teka
*Assistant Examiner* — Daniel S Collins
(74) *Attorney, Agent, or Firm* — Scott D. Swanson; Shaver & Swanson, LLP

(57) ABSTRACT

An improved master cylinder for use with a hydraulic clutch or hydraulic brake system. The master cylinder has a master cylinder body defining a bore. A piston is configured to slide in the bore when an actuation lever is compressed by a user. Sliding of the piston as a result of the depression of the lever causes the piston to depress a spring and to increase hydraulic pressure in the hydraulic line leading to the brake or clutch. A spring is configured to return the piston when pressure is released from the actuation lever. The master cylinder body in some embodiments is configured for lateral position adjustment relative to a mounting bracket. In some embodiments the master cylinder has a reservoir. The reservoir can be oriented at a tilted angle relative to the body of the master cylinder. In further embodiments the master cylinder has an outlet nut that is configured for attachment to the hydraulic line. The outlet nut is configured such that removal of the outlet nut allows for access to the bore, including the spring and piston.

14 Claims, 14 Drawing Sheets

MASTER CYLINDER

PRIORITY/CROSS-REFERENCE TO RELATED APPLICATIONS

This application claims the benefit of U.S. Provisional Application No. 63/007,162, filed Apr. 8, 2020, the disclosure of which is incorporated by reference.

TECHNICAL FIELD

The disclosure generally relates to the field of hydraulic actuation systems for vehicles used for brake control and clutch control. Particular embodiments relate to braking technology and clutch control technology for vehicles utilizing a hydraulic master cylinder.

BACKGROUND

Master cylinders are typically used in hydraulic circuits to convert force applied to a pedal or lever into hydraulic pressure that actuates one or more brakes or actuates a clutch. Motorcycles typically have a master cylinder having a lever actuator attached to the handlebar of the motorcycle. Motorcycles can further have one or more pedal actuated master cylinders either in addition to a handlebar mounted master cylinder or in lieu of a handlebar mounted master cylinder. Motorcycles can further utilize multiple handlebar mounted master cylinders on opposite ends of the handlebar or mounted on the same side of the handlebar. However, current mounting brackets do not facilitate a mechanism to adjust the positioning of the master cylinder relative to the handlebar while retaining the position of the mounting bracket.

What is needed is an improved master cylinder design that allows for serviceability of the master cylinder piston, seals and internal components that makes it easier for a user including not having to depress a spring while trying to remove a snap ring and then having the potential of the piston flying out of the master cylinder due to the spring pushing it out. Alternatively and/or additionally, what is also needed is a mounting system allowing lateral positioning of the master cylinder body relative to the handlebar and independent of the handlebar mounting means of the master.

BRIEF DESCRIPTION OF THE FIGURES

FIG. 14 illustrates a side isometric view of stacked mounting of two master cylinders each having a tilted reservoir.

SUMMARY

Figure 1:
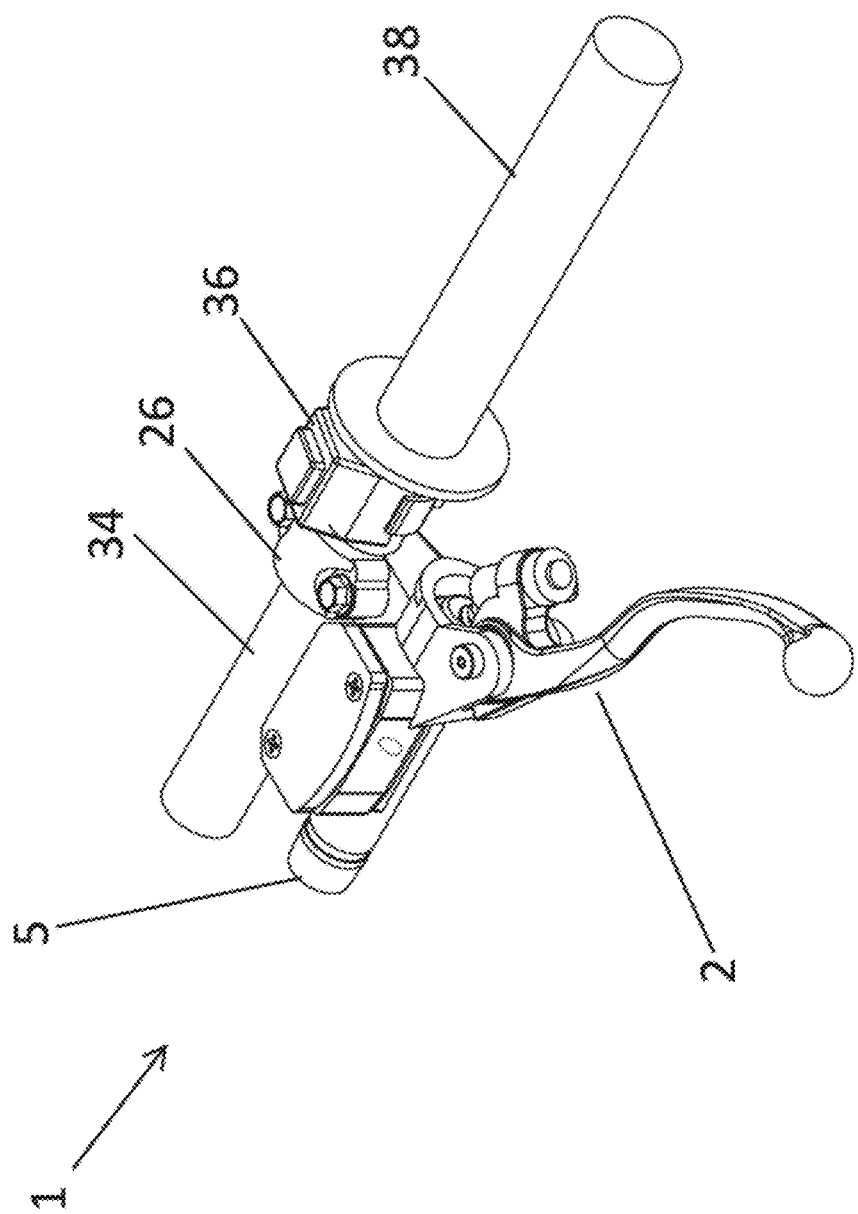
FIG. 1 is a perspective view of a prior art embodiment of a master cylinder assembly for actuating a hydraulic clutch or hydraulic brake.

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a master cylinder for a hydraulic system. The master cylinder assembly having a master cylinder body. The master cylinder body defining a cylindrical master cylinder a piston. A lever is configured to depress to cause said piston to slide in said bore when said lever is advanced toward the master cylinder assembly, thus increasing pressure on hydraulic line to which the master cylinder assembly is connected. A mounting bracket configured to attach said master cylinder assembly to a handlebar, wherein said master cylinder is configured for lateral adjustment of the mounting position of said master cylinder to said mounting bracket parallel to the orientation of a handle bar on which the mounting bracket is positioned.

In one embodiment the master cylinder assembly has a rail either attached to the master cylinder assembly or integral with the master cylinder assembly. In this embodiment the mounting bracket has a rail clamp configured to secure the rail in the rail clamp thereby attaching the master cylinder assembly to the handlebar of a vehicle. The rail is configured to slide in the rail clamp for lateral adjustment of the master cylinder relative to the mounting bracket. The rail clamp is preferably configured to be tightened to secure the rail in place. Preferably a bolt is used to tighten the rail clamp. The master cylinder can be used with either a brake circuit or a clutch circuit.

The mounting bracket is configured to attach to a handlebar. Preferably this is by a handlebar clamp having two opposing segments. The track is preferably configured on one of said opposing segments. The rail is configured to be positioned within the claim. The rail can be integral with the master cylinder housing or attached to the master cylinder housing. Preferably rail has a plurality of positioning cutouts on the surface of the rail. The bolt discussed above is preferably positioned within a positioning cutout to tighten the rail clamp to secure the rail. The positioning of the rail clamp and rail can be reversed, with the rail being attached to the mounting bracket and the rail clamp being positioned on the master cylinder assembly.

The master cylinder assembly can include a reservoir. This reservoir can be formed so as to be at a tilted angle to the master cylinder assembly to facilitate stacking and/or positioning of the master cylinder body relative to other components attached to the handlebar.

Also disclosed is an improved master cylinder assembly that facilitates servicing of the piston and internal components of the master cylinder assembly. The master cylinder has a master cylinder body. The master cylinder body defining a bore. A lever is operatively attached to the master cylinder body at a first end of the master cylinder body. A piston is positioned within the bore and operatively connected to the lever such that when the lever is depressed the piston moves in a first direction away from the first end of the master cylinder body. An outlet nut is connected to a second end of the master cylinder body. The outlet nut is configured for connection to a hydraulic line such that the hydraulic line is in fluid connection with the bore. A spring is positioned between the outlet nut the piston and operatively connected to the piston such that the spring is configured to be compressed when the piston moves in the first direction when the lever is depressed. The said spring is configured to extend to return the piston in the opposite (or second) direction when pressure depressing the lever is released. The outlet nut is configure such that removal of the outlet nut allows for the spring to extend and provides access to the bore and the piston. Preferably the spring is seated at a first end of the spring against a shoulder of the outlet nut.

DETAILED DESCRIPTION OF THE PREFERRED EMBODIMENTS ILLUSTRATED IN THE FIGURES

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Figure 2:
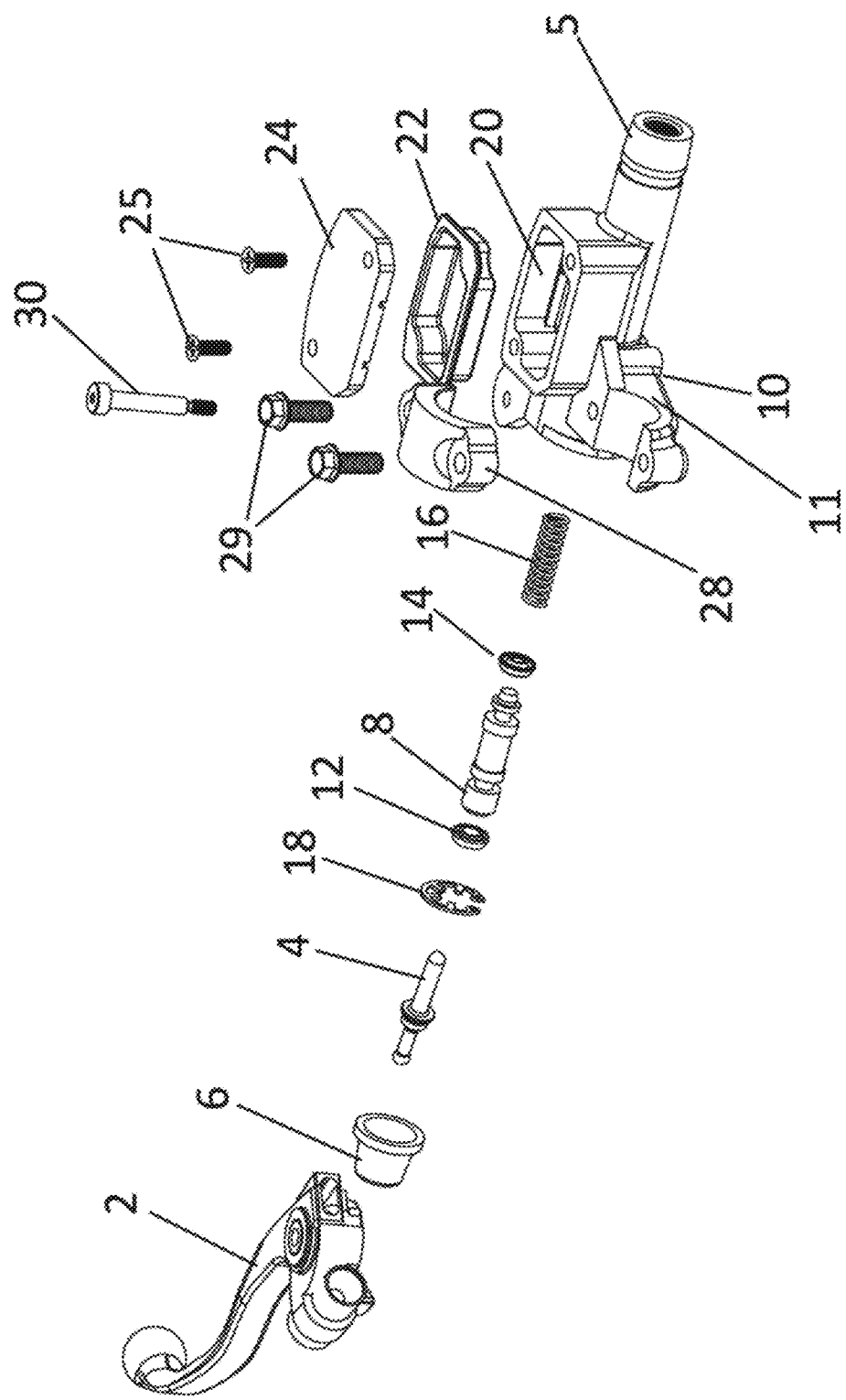
FIG. 2 illustrates an exploded view of a prior art embodiment of a master cylinder assembly for actuating a hydraulic clutch or hydraulic brake.
Figure 3:
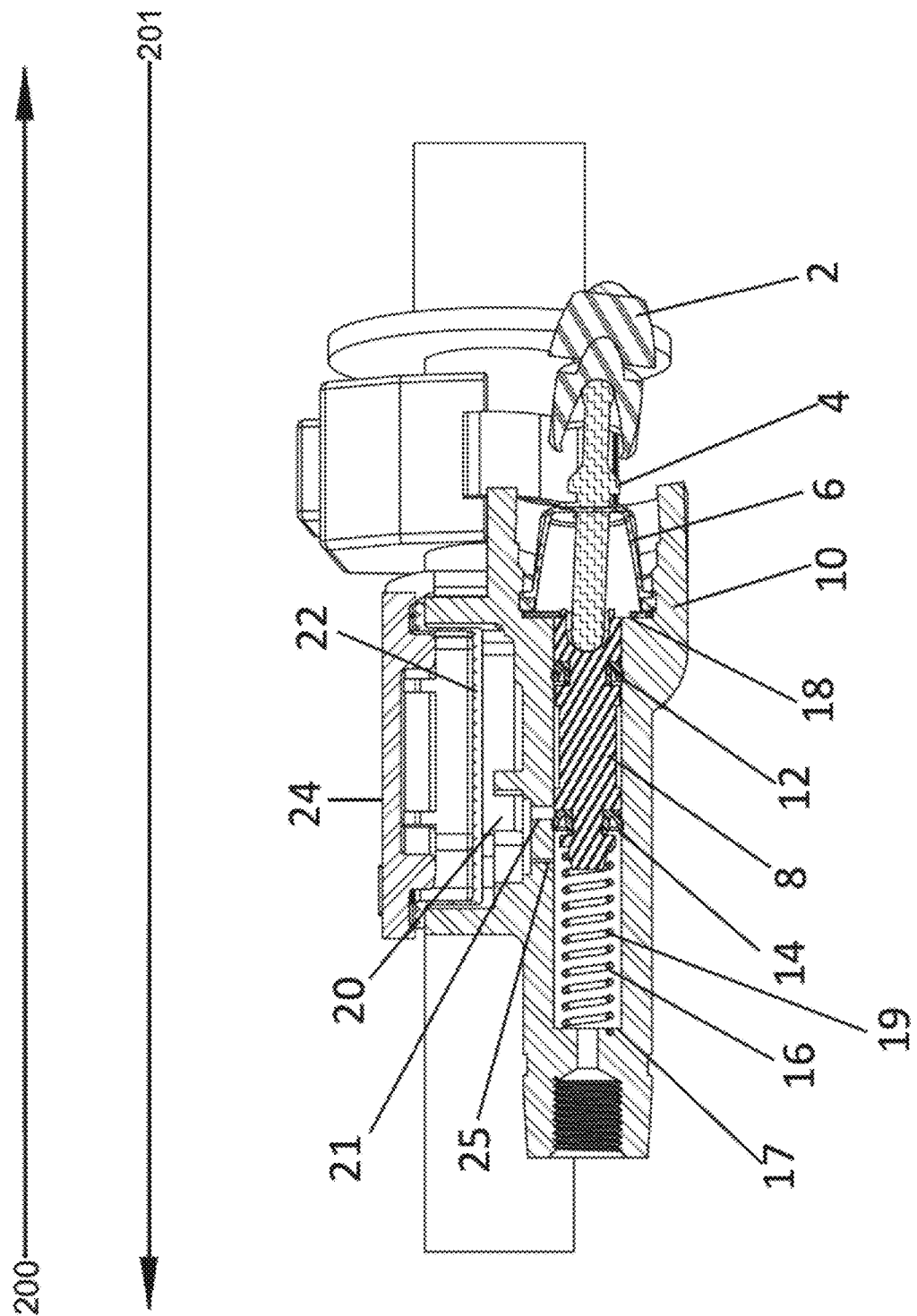
FIG. 3 illustrates a section view of a prior art embodiment of a master cylinder assembly for actuating a hydraulic clutch or hydraulic brake.

FIGS. 1-3 illustrate an example prior art embodiment of a master cylinder assembly for actuating a hydraulic clutch or hydraulic brake. FIG. 1 illustrates an isometric view of the example prior art embodiment. A master cylinder assembly 1 is mounted on a handlebar 34. A starter button or kill switch 36 is mounted on the handlebar 34 between the master cylinder handlebar clamp 26 and the grip 38. In use, a rider grasps the grip 38 and uses his or her fingers to depress the lever 2 to actuate a clutch or brake. A hydraulic line attaches to the first end 5 of the master cylinder body 10 and extends to a clutch slave cylinder or brake caliper (not shown).

FIG. 2 provides an exploded view of the example prior art embodiment. The depicted master cylinder assembly 1 has a lever 2 connected to a master cylinder body 10. The lever is attached to the master cylinder body 10 and configured to pivot at a lever pivot 30. The lever 2 is configured to act on an actuating pin 4. The pin 4 extends through a dust cover 6 and is configured to act on a piston 8. When pressure is applied depressing the lever 2 causes the actuating pin 4 to act on the piston 8, causing the piston 8 to travel in the master cylinder body 10 away from the lever 2 in a first direction (shown as arrow 201 in FIG. 3). Movement of the piston in the first direction provides hydraulic pressure in a hydraulic line (not shown) extending from the outlet 5 to a slave cylinder or brake caliper (not shown) while compressing piston return spring 16 against a shoulder 17 of the master cylinder body 10. The piston 8 has a first seal 14 and a second seal 12. The hydraulic line is typically a pipe or tube through which the master cylinder is hydraulically connected to a slave cylinder or brake caliper. The hydraulic pressure provides hydraulic actuation of a brake caliper at a disc brake (not shown) or clutch slave cylinder (not shown).

When pressure on the lever is released, the piston return spring 16 extends and causes the piston to return (in the direction of arrow 200 of FIG. 3) toward its original position. A snap ring 18 is configured to provide a limit to the return of the piston due to the spring when pressure is released from the lever.

A reservoir 20, defined by the body of the master cylinder, is configured to hold a reserve of hydraulic fluid. The reservoir 20 is covered by cap 24 which encloses the opening at the top of the reservoir 20. The cap 24 is affixed to the master cylinder body 10 via screws 25. When pressure on the lever 2 is released, the piston 8 returns toward to its starting position and fluid from the reservoir replenishes fluid in the hydraulic line via ports 21 and 27 between the reservoir 20 and the master cylinder bore. A diaphragm 22 serves to seal the interface between the reservoir 20 and the cap 24 and to maintain the pressure of the hydraulic system and allow for expansion and contraction of the fluid level within the reservoir. A mounting bracket 11 is formed into the master cylinder body 10 allowing the master cylinder assembly 1 to be mounted to a handlebar 34 with the handlebar clamp 28 and screws 29 This type of construction is typified in prior art master cylinder assemblies. With this type of construction the user can loosen the screws 29 in order to rotate the master cylinder assembly 1 into alternate position rotationally about the handlebar 34 center of axis. In addition a user can selectively move the position of the master cylinder assembly axially along the length of the handlebar 34 depending on personal preferences for where the user wants the lever 2 positioned relative to the grip 38.

To service the prior art master cylinder piston and seals requires removal of the lever, removal of the actuation pin, removal of the dust cap, and then removal of the snap ring 18. Removal of the snap ring 18 allows the return spring 16 to extend, potentially pushing the piston out of the master cylinder from the force of the extending spring. This does not create an ideal servicing arrangement as a servicer must be careful not to allow the piston 8 to propel away from the user.

FIG. 3 illustrates a section view of a prior art master cylinder. As discussed above, a rider depresses the clutch lever 2 causing the pin 4 to move the piston 8 through the bore 19 in a first direction indicated by arrow 201, thus increasing hydraulic pressure in the hydraulic line downstream of the piston and compressing the return spring 16. This increases hydraulic pressure within the hydraulic line extending from the master cylinder. The increased hydraulic pressure in the hydraulic line actuates the brake caliper or clutch. When the rider releases pressure on the lever, the return spring 16 causes the piston to return in the second direction indicated by arrow 200 to the starting position.

What is disclosed herein is an improved mounting mechanism for attaching a master cylinder to a handlebar of a motorcycle to provide lateral adjustability of the master cylinder relative to a handlebar mounting bracket. What is further disclosed is an improved master cylinder assembly that provides improved serviceability of the master cylinder, in particular the piston assembly of the master cylinder.

Figure 4:
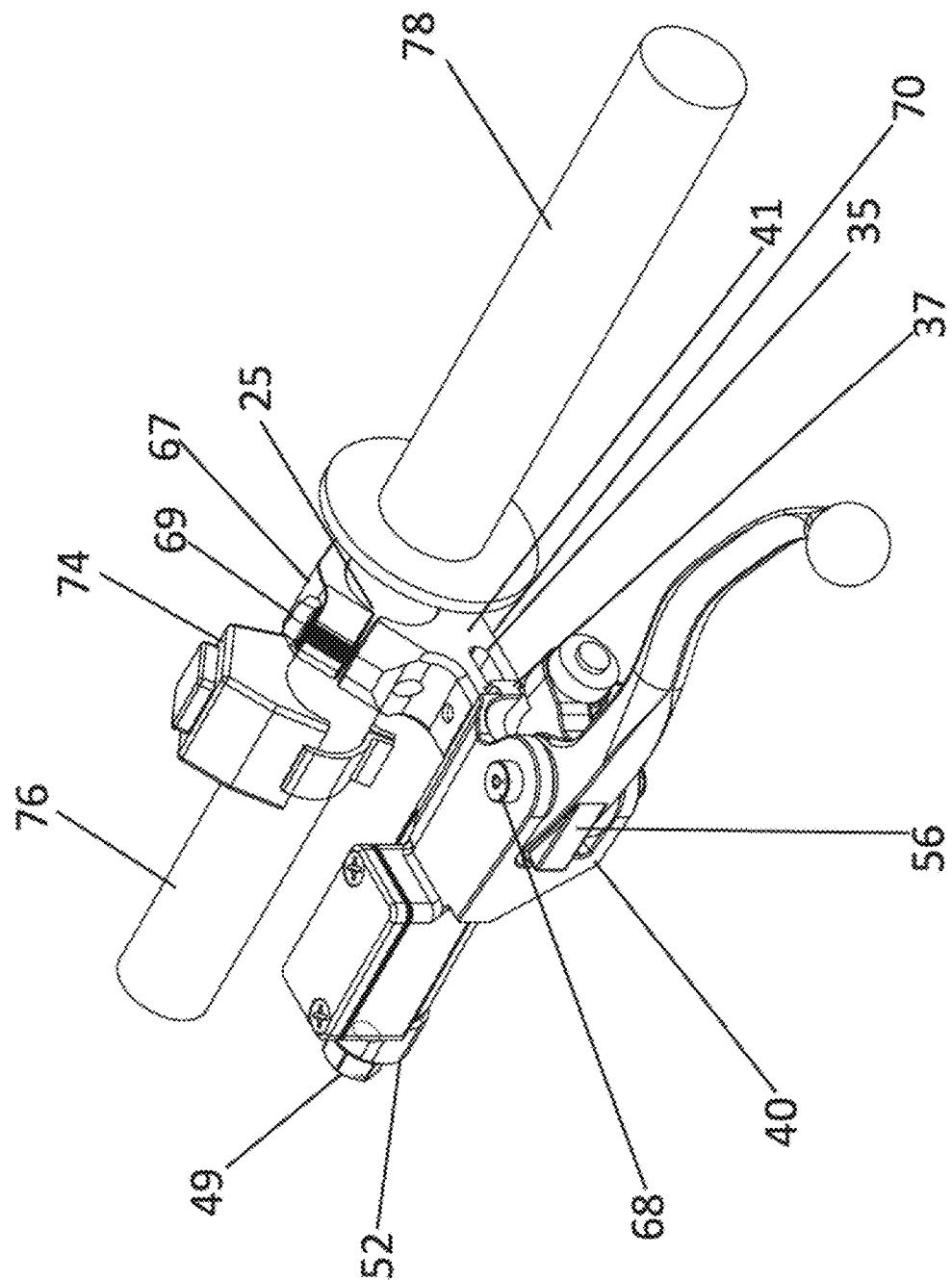
FIG. 4 illustrates a perspective view of a preferred embodiment of master cylinder assembly for actuating a hydraulic clutch or hydraulic brake.
Figure 7:
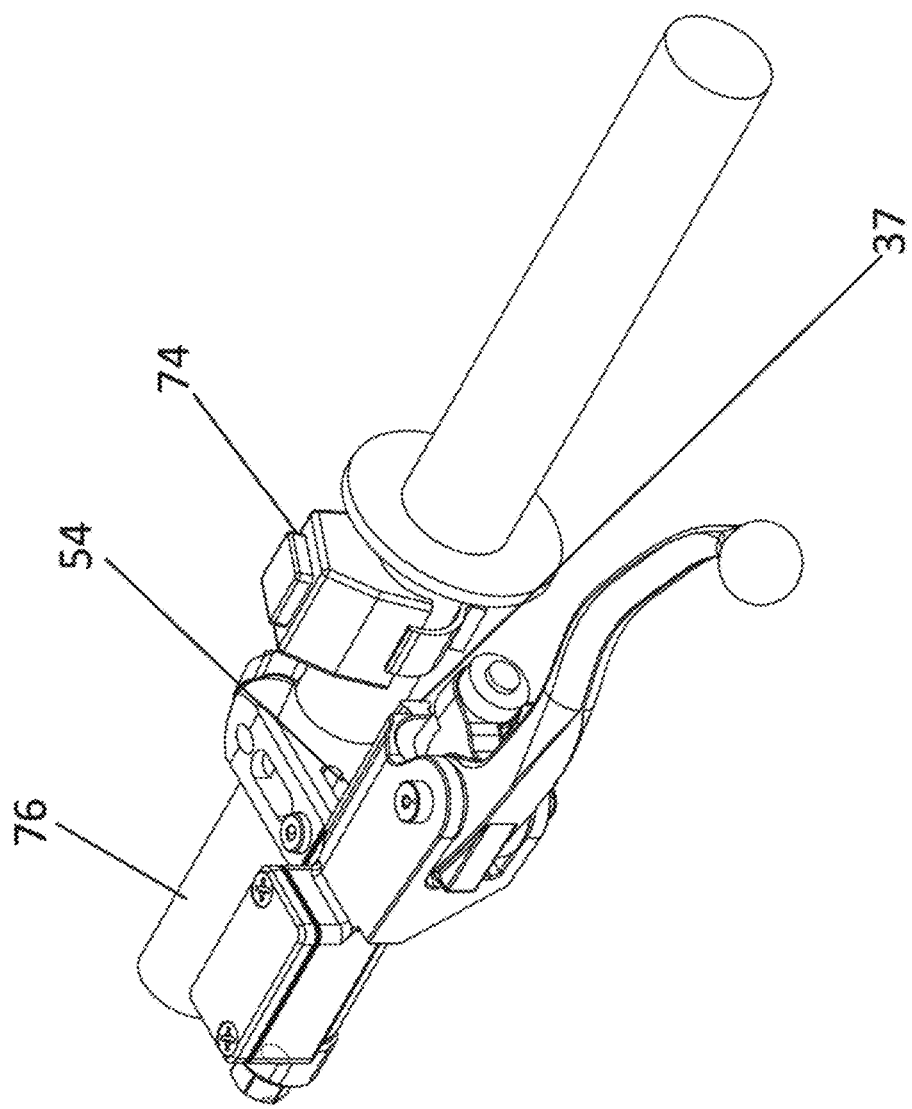
FIG. 7 illustrates a perspective view of a preferred embodiment of master cylinder assembly for actuating a hydraulic clutch or hydraulic brake.

FIG. 4 illustrates a perspective view of a preferred embodiment of a master cylinder disclosed herein mounted to a handlebar 76. The lever 56 is configured to pivot on a lever pivot 68 to actuate the clutch when the lever is depressed. The lever pivot 68 can be configured to thread into the master cylinder body 40 or to attach to the master cylinder body 40 using a lever pivot nut 20 (shown in FIG. 5). A handlebar clamp cap 67 attaches to the mounting bracket 41 with handlebar clamp cap bolts 69. The mounting bracket 41 has a U-shaped bar cutout 66 configured for attachment to a handlebar 76 and opposing legs 70 which extend from the handlebar portion of the mounting bracket 41. Together the U-shaped bar cutout 66 and the handlebar clamp cap are referred to as the handlebar clamp. The opposing legs 70 of the rail clamp have cutout features creating rail clamp features 35 which are configured to interface around rail 37 extending from the master cylinder body 40. The opposing legs 70 of the rail clamp are preferably off center relative to the center of the U-shaped bar cutout 66 opening for the handlebar 76. This allows the handlebar clamp to be affixed to the handlebar 76 with the opposing legs 70 of the rail clamp extending either above the handlebar 76 (as shown in FIG. 7) or below the handlebar 76 (as shown in FIG. 4).

Figure 5:
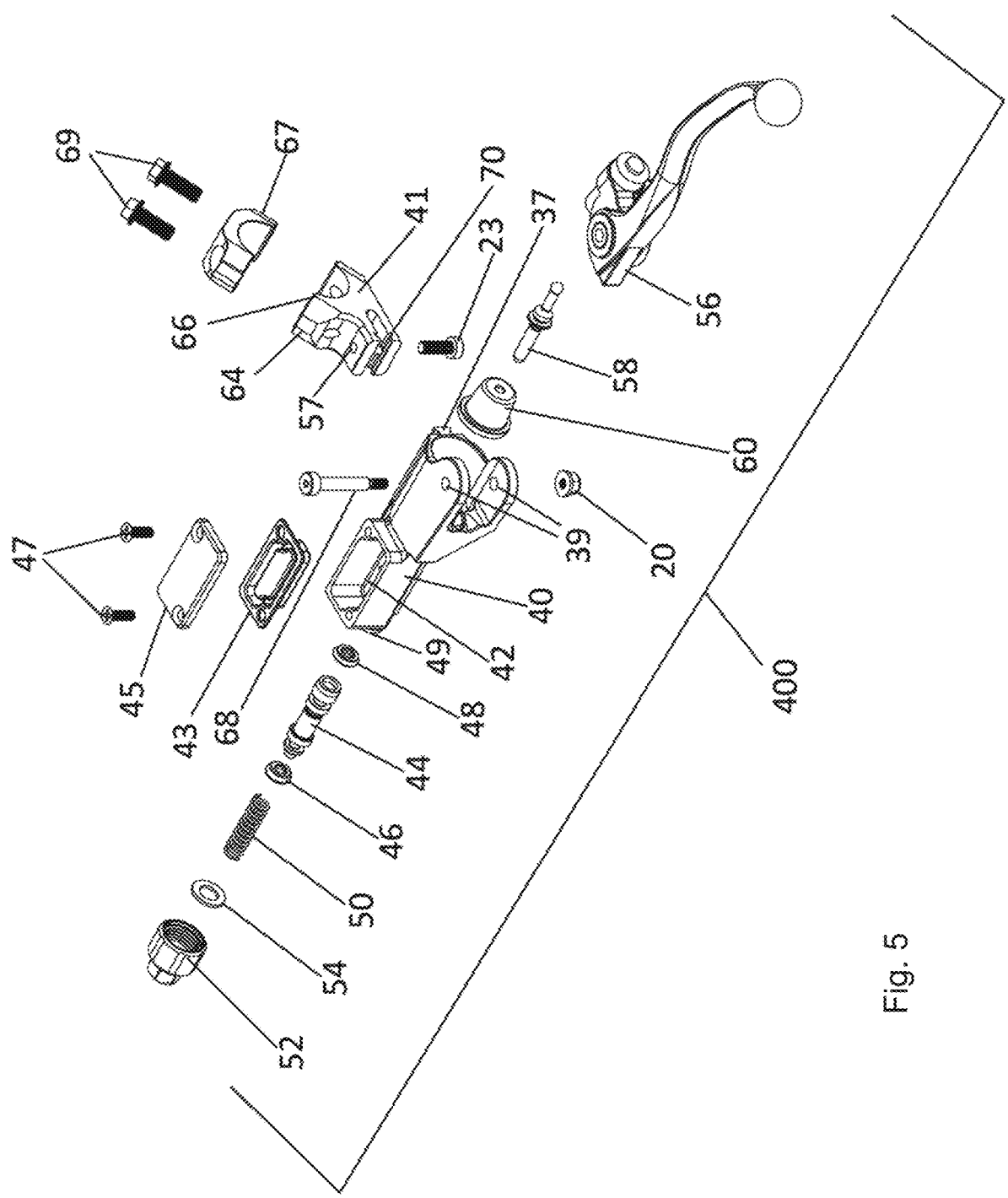
FIG. 5 illustrates an exploded view of a preferred embodiment of master cylinder assembly for actuating a hydraulic clutch or hydraulic brake.
Figure 6:
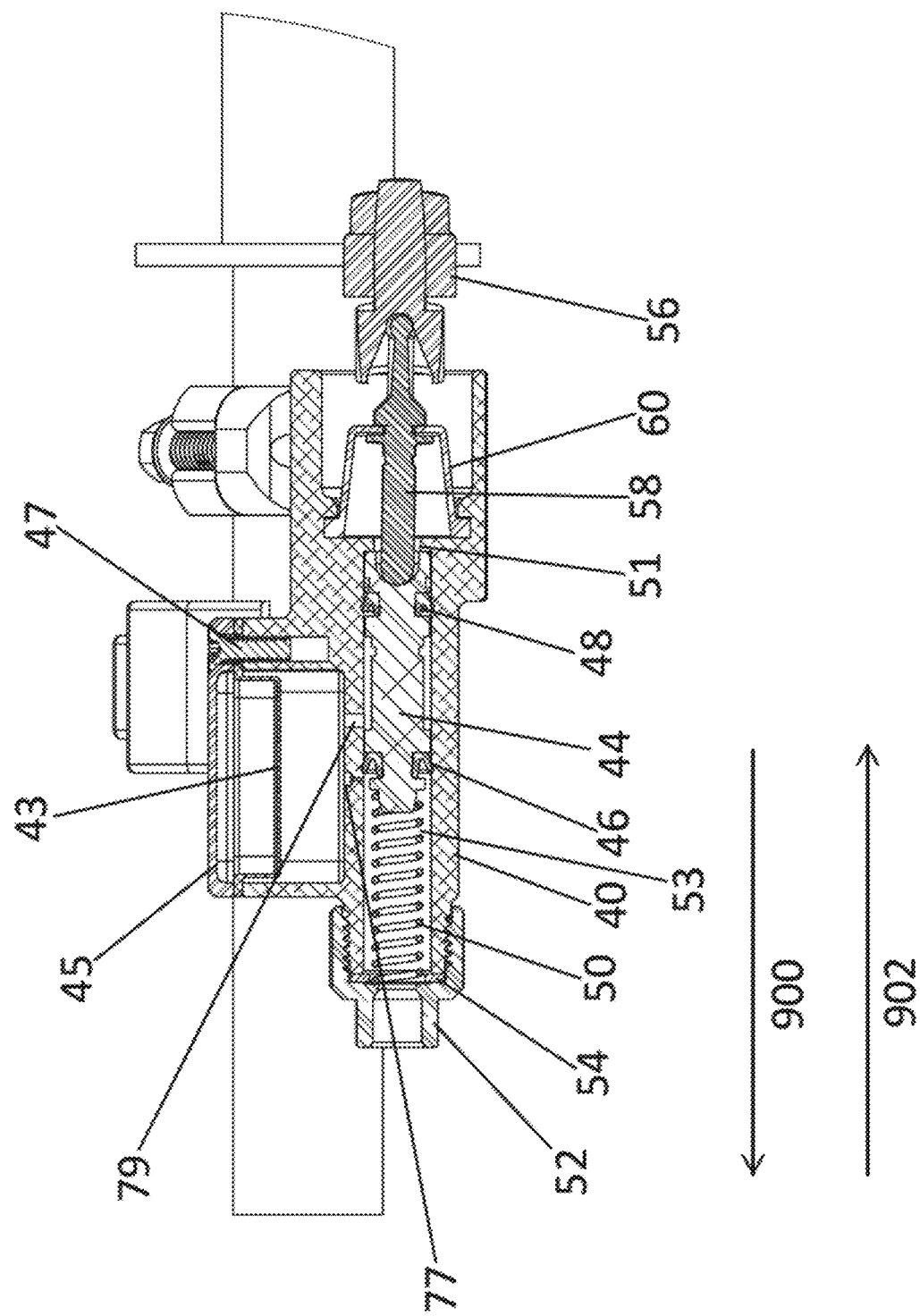
FIG. 6 illustrates a section view of a preferred embodiment of master cylinder assembly for actuating a hydraulic clutch or hydraulic brake.

FIG. 5 illustrates an exploded view of a preferred embodiment of the master cylinder assembly 400 shown in FIG. 4. FIG. 6 illustrates a section view of the preferred embodiment depicted in FIGS. 4 and 5. The master cylinder assembly 400 is comprised of a master cylinder body 40, dust cover 60, actuation pin 58, lever 56, lever pivot 68, nut 20, piston 44, first seal 48, second seal 46, piston return spring 50, outlet seal 54, outlet nut 52, diaphragm 43, cap 45, cap screws 47, mounting bracket 41, bracket screw 23, handlebar clamp cap 67 and handlebar clamp cap bolts 69.

The master cylinder body 40 defines a reservoir 42. The master cylinder body further defines a bore 53 (illustrated in FIG. 6) in which the piston is configured to slide to increase pressure on the hydraulic fluid in the hydraulic system downstream of the piston to actuate a brake caliper or clutch slave cylinder. The piston 44 is configured to slide in a first direction (arrow 900 of FIG. 6) when the lever 56 attached to the master cylinder body 40 is depressed. An actuation pin 58 extends from the lever 56 through a dust cover 60 to the piston 44. Depression of the lever 56 causes the actuation pin 58 to slide in the direction of the piston 44, causing the piston 44 to slide within the bore 53 away from the lever 56.

A piston return spring 50 is positioned in the bore 53 on the opposite side of the piston 44 from the lever 56 and actuation pin 58. Depression of the lever 56 causes the actuation pin 58 to act on the piston 44 to slide the piston toward the outlet nut 52. Sliding movement of the piston away from the lever compresses the piston return spring 50 against a shoulder of the outlet nut 52. When force depressing the lever is released, the piston return spring 50 extends causing the piston 44 to slide toward its initial position. The piston stops sliding in the second direction when it reaches a stop provided by a shoulder 51 of the master cylinder body. A hydraulic line (not shown) attaches to the outlet at the outlet nut 52. The piston 44 is provided with two seals, first seal 48 and second seal 46, that prevent hydraulic fluid from passing around the piston. In a preferred embodiment these seals are cup seals. Compensating port 77 is shown fluidly connecting the bore 53 to the reservoir 42 to allow for replenishing of the hydraulic fluid within the bore 53 and hydraulic line when the piston returns toward it starting position. Bleed port 79 is shown fluidly connecting the bore 53 to the reservoir 42 to allow for replenishing hydraulic fluid when the lever is depressed, allowing for bleeding gas from the hydraulic line during installation and/or servicing. In a preferred embodiment the outlet nut 52 is configured to thread onto a threaded end 49 of the master cylinder body 40 with an outlet seal 54 positioned between the outlet nut 52 and the master cylinder body 40. When the lever 56 is depressed, the piston 44 sliding toward the outlet nut 52 causes an increase in hydraulic pressure in the hydraulic line (not shown) causing actuation of the slave cylinder of a clutch or a brake.

To service the master cylinder piston of FIGS. 4, 5, and 6, the outlet nut 52 and outlet seal 54 are removed, the piston return spring 50 is then removed, providing access to the piston. This eliminates spring pressure on the piston experienced when servicing pistons of prior master cylinders known to the Applicant. In an alternative embodiment the spring end contacting the piston can be fitted to seat around the piston end tightly allowing the user to pull on the spring and thus remove the piston for even greater ease.

Figure 5A:
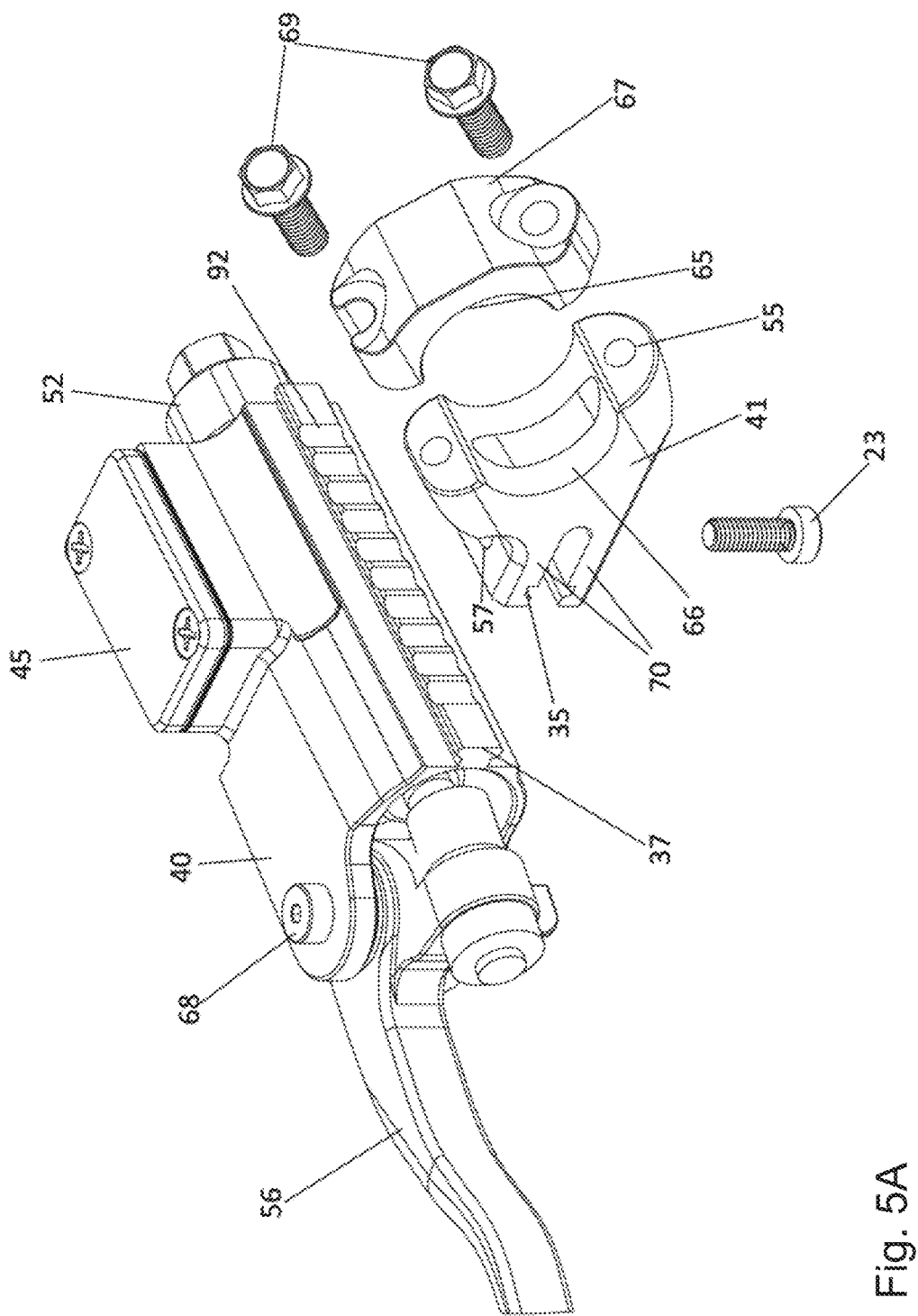
FIG. 5A illustrates a partially exploded view of a preferred embodiment of master cylinder assembly for actuating a hydraulic clutch or hydraulic brake.

FIGS. 4, 5, 5A, and 6 further disclose a master cylinder body 40 configured for lateral adjustment relative to the mounting bracket 41. FIG. 5A illustrates the master cylinder assembly 400 in which the mounting bracket 41 and the handlebar clamp cap 67 are detached. As shown in FIG. 5A the mounting bracket 41 is comprised of opposing legs 70 forming the rail clamp, U-shaped bar cutout 66 and rail clamp features 35 and threaded holes 55. The threaded holes 55 accommodate handlebar clamp cap bolts 69 allowing the handlebar clamp cap 67 having a U-shaped bar cutout 65 to be secured to the mounting bracket 41 around a handlebar. The rail clamp features 35 are configured to interface around rail 37. Bracket screw 23 secures the mounting bracket 41 to the rail 37. The bracket screw 23 threads into the threaded hole 57. The rail 37 contains cutouts 92 which index around the bracket screw 23 when the mounting bracket 41 is installed onto the rail 37.

The mounting bracket 41 attaches to the handlebar 76. In the depicted preferred embodiment the master cylinder body 40 is attached to the handlebar 76 via mounting bracket 41. The mounting bracket 41 has a handlebar mount 25 and rail clamp having opposing legs 70 each having rail clamp features 35. The mounting bracket 41 includes a generally U-shaped first portion 66 and a handlebar clamp cap 67 configured to attach to the U shaped opening 66 to attach to a handlebar.

As depicted in FIGS. 4 and 5, a rail 37 positioned on the master cylinder body 40 is configured to slide within opposing legs 70 to provide lateral adjustability of the master cylinder body relative to the handlebar mounting bracket 41. The rail 37 can be formed directly on to the master cylinder body 40 or attached to the master cylinder body 40. The opposing legs 70 are tightened by a bracket screw 23 to retain the rail in position in the rail clamp. In the depicted embodiment the bracket screw 23 passes through a first leg 138 of the rail clamp and is configured for threaded engagement with an opening in the second leg 139 of the rail clamp (shown in further detail in FIGS. 8-10). The rail 37 has a series of cutouts 92 on an outer surface of the rail 37. The cutouts provide a positioning mechanism through which the bolt is positioned when securing the rail in the rail clamp. The cutouts 92 ensure the lateral position of the master cylinder body 40 is more securely fixed because the side walls of the cutouts 92 will come in tangent contact with the shaft of the bracket screw 23 preventing the master cylinder body 40 from sliding too far out of adjustment in a situation if the bracket screw 23 is not tightened properly. The lateral adjustability of the master cylinder relative to the mounting bracket allow for customization of the position of the master cylinder relative to other components on the handlebar of a motorcycle. For example, FIG. 4 illustrates a starter button or kill switch 74 positioned on the opposite side of the mounting bracket from the grip 78. In contrast, FIG. 7 illustrates the kill switch or starter button or kill switch 74 positioned between the mounting bracket and the grip. In an alternative embodiment the cutouts 92 are not present in the rail 37. Furthermore, in yet another embodiment a spring loaded ball bearing could index into alternatively formed and matching detents in either the rail clamp body or alternatively the rail.

The rail and rail clamp configuration to attach the master cylinder to a handlebar and provide lateral adjustability can be utilized with the newly disclosed internal master cylinder configuration of FIGS. 4-6, or alternatively with any internal configuration. The rail clamp and rail provide for lateral adjustability of the position of the master cylinder in relation to the handlebar 76 of the motorcycle while allowing the rail clamp to remain stationary.

Figure 8:
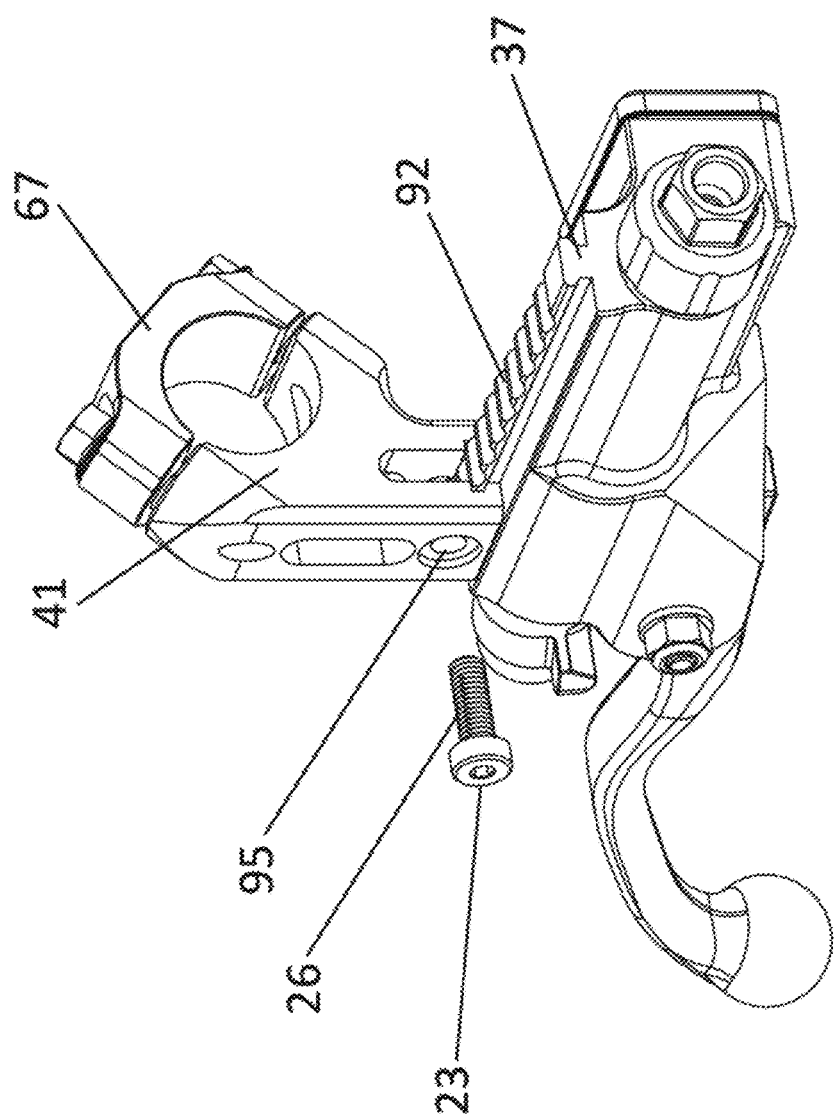
FIG. 8 illustrates a partially exploded view of a preferred embodiment of master cylinder assembly for actuating a hydraulic clutch or hydraulic brake.
Figure 9:
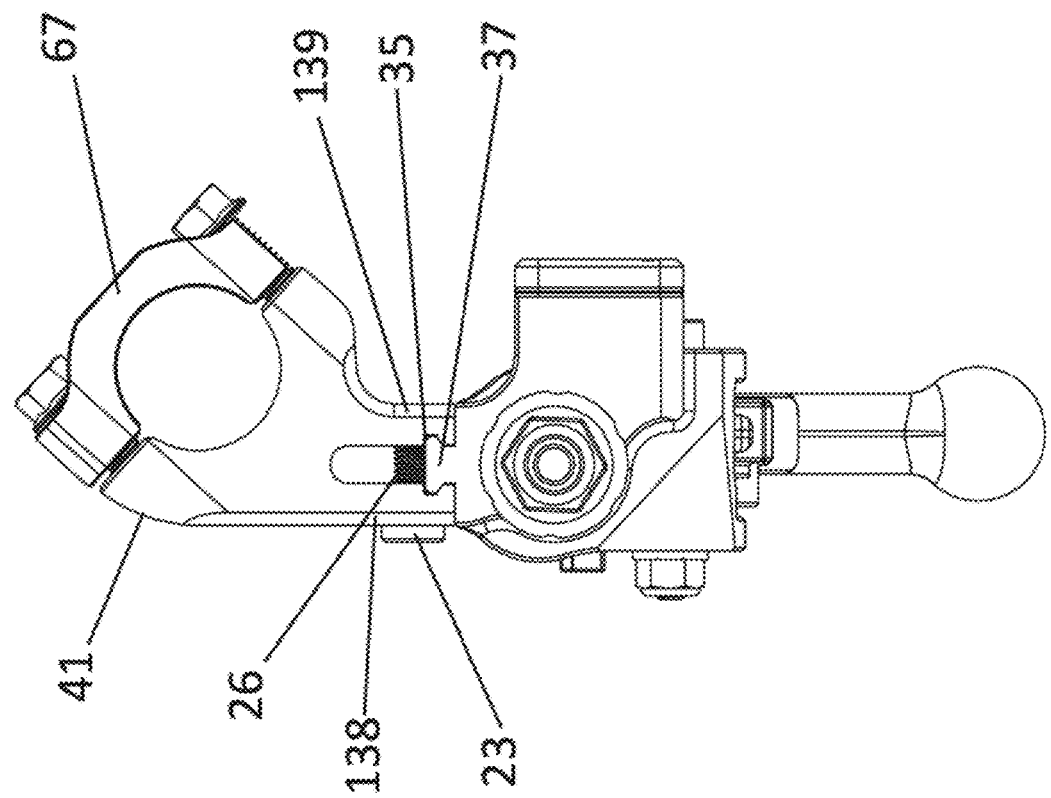
FIG. 9 illustrates a side isometric view of a preferred embodiment of master cylinder assembly for actuating a hydraulic clutch or hydraulic brake.

FIGS. 8-9 provide further detail of an embodiment of a master cylinder having lateral adjustability relative to its handlebar mount. FIG. 8 illustrates the interaction between the rail of the master cylinder and the rail clamp of the mounting bracket to provide lateral adjustability of the master cylinder. While in the depicted embodiment the rail is attached to the master cylinder, in alternative embodiments the rail can be attached to the mounting bracket and the rail clamp attached to the master cylinder body. In yet another embodiment the rail can be a multi-stepped slot and the rail clamp can have ends which index into this slot and the securing bolt can fasten into the master cylinder body rather than how depicted in the preferred embodiment(s) depicted. The rail 37 is depicted with cutouts 92. The mounting bracket 41 is configured such that the rail 37 slides within the opposing legs of the rail clamp when bracket screw 23 is removed. The rail 37 is engaged by opposing legs 70 of the rail clamp. Bracket screw 23 is configured to pass through an opening 95 in a first leg of the rail clamp, through one of the cutouts in the series of cutouts 92 on the face of the rail 37, and to thread via threads 26 into a threaded opening in the opposing leg of the rail clamp.

Figure 10:
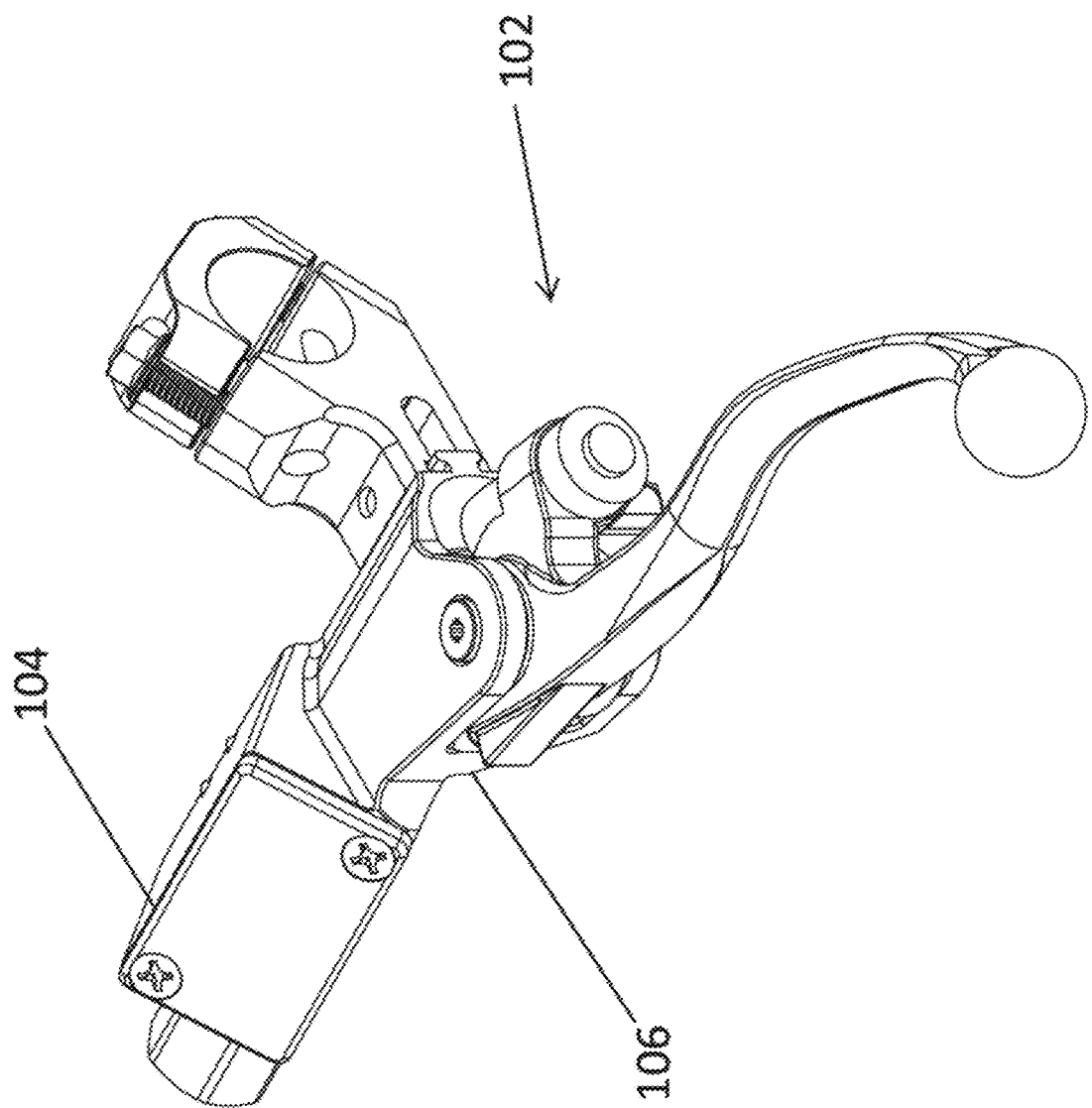
FIG. 10 illustrates a perspective view of a preferred embodiment of master cylinder assembly having a tilted reservoir for actuating a hydraulic clutch or hydraulic brake

FIG. 9 illustrates a side view of master cylinder assembly showing the interface between the assembled rail clamp and rail 37 of a master cylinder. The bracket screw 23 is tightened on the opposing legs 138, 139 to secure the mounting bracket 41 to the rail 37 with the bracket screw 23 positioned within a cutout of the series of cutouts 92 on the face of the rail. FIG. 10 illustrates the mounting bracket attached via the rail clamp to the rail of the master cylinder.

The embodiments disclosed herein can be utilized in a brake circuit, a clutch circuit, and/or with foot actuated clutch or brake cylinders. While the depicted embodiment shows a master cylinder utilizing a reservoir, the adjustable bracket can be utilized with master cylinders that do not utilize a reservoir.

Figure 11:
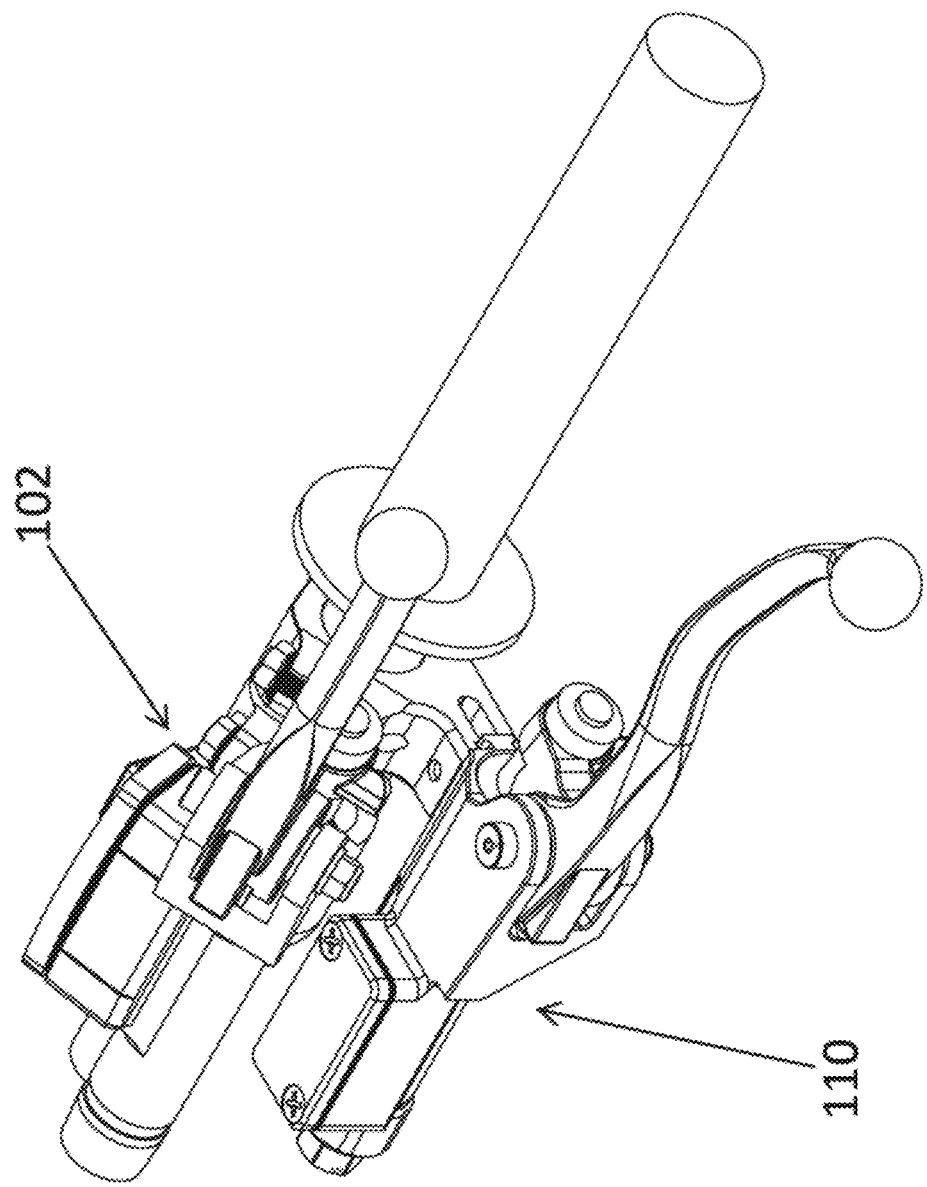
FIG. 11 illustrates a perspective view of a preferred embodiment of master cylinder assembly having a tilted reservoir stacked above a second master cylinder assembly.

FIG. 10 shows an alternate embodiment of a master cylinder 102. In the depicted alternative alternate embodiment, the reservoir 104 is provided at a tilted orientation to the lever and remainder of the master cylinder body 106. This allows a rider to mount the master cylinder below another lever or master cylinder and provide access to the reservoir as well as to facilitate closer mounting of two stacked master cylinders as shown in FIG. 11. The tilted reservoir can be utilized with master cylinders having internal components as those in the prior art or as those having internal components as shown in FIGS. 4-6. Similar embodiments having tilted reservoirs can be utilized in conjunction with the rail and rail clamp system described herein or with traditional mounting mechanisms.

FIG. 11 illustrates a master cylinder 110 having a non-tilted reservoir positioned below an embodiment of the master cylinder with a tilted reservoir 102 as shown in FIG. 10. the lower master cylinder is depicted with the handlebar clamp oriented such that that the leg of the rail clamp is extending beneath the handlebar to facilitate mounting of the upper master cylinder. This allows for increased room to position the upper master cylinder above the lower master cylinder.

Figure 12:
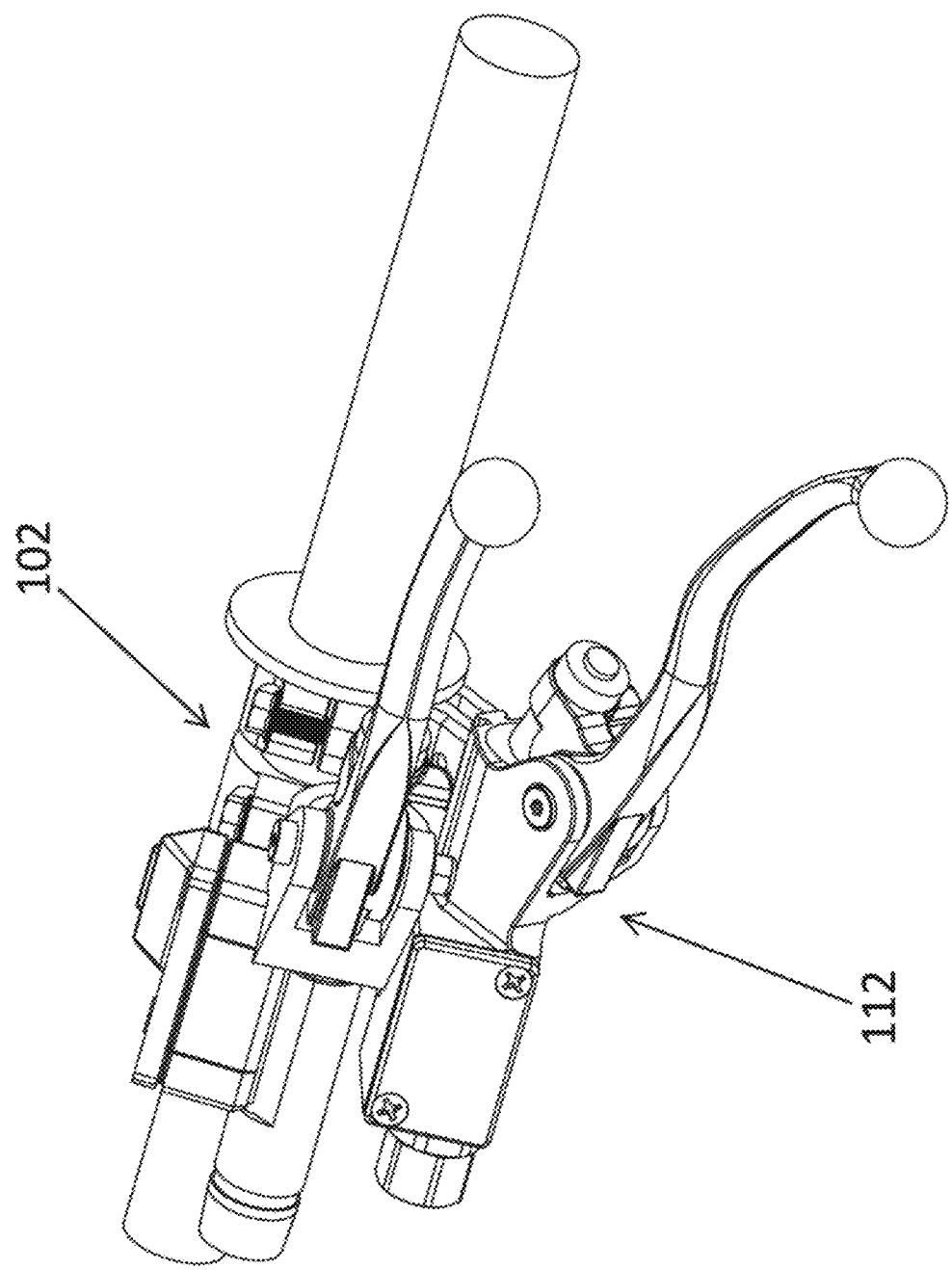
FIG. 12 illustrates a perspective view of stacked mounting of two master cylinders each having a tilted reservoir.
Figure 13:
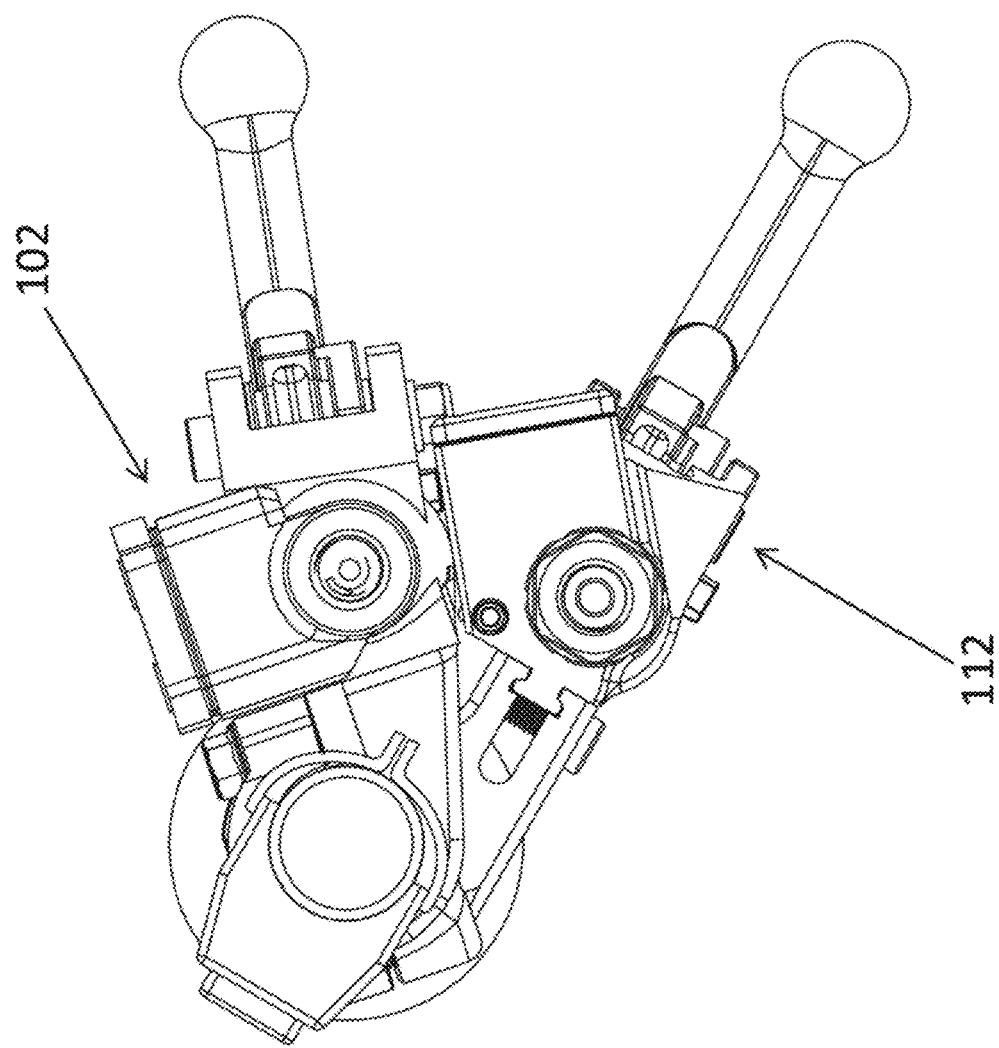

FIG. 12 illustrates stacked mounting of two master cylinders 102, 112 each having a tilted reservoir relative to the lever and remainder of the master cylinder body. FIG. 13 illustrates a side view of the stacked master cylinders of FIG. 12 to illustrate the improved positioning that the tilted reservoirs provides for in stacking two master cylinders. The upper master cylinder is positioned as close as possible to the lower master cylinder, while still allowing access to the reservoir of the lower cylinder. Further, because the master cylinder reservoir typically extends above the top of the handle in a standard reservoir alignment relative to the master cylinder body, rotating or tilting the reservoir allows for the stacked master cylinders to be positioned closer together to facilitate use by a rider.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

The invention claimed is:

1. A master cylinder for a hydraulic system, said master cylinder comprising:

a master cylinder assembly comprising a master cylinder body, wherein said master cylinder body defines a cylindrical master cylinder bore and a piston positioned in said cylinder bore;

a lever configured to depress to cause said piston to slide in said cylindrical master cylinder bore when said lever is advanced toward the master cylinder body; and a mounting bracket configured to attach said master cylinder assembly to a handlebar, wherein said master cylinder is configured for lateral adjustment of the mounting position of said master cylinder to said mounting bracket, wherein said lateral adjustment is parallel to the orientation of a handle bar on which the mounting bracket is positioned.

2. The master cylinder of claim 1, wherein said master cylinder assembly comprises a rail, wherein said mounting bracket comprises a rail clamp configured to secure said rail in said rail clamp, wherein said rail is configured to slide in said rail clamp for said lateral adjustment of said master cylinder relative to said mounting bracket.

3. The master cylinder of claim 2, wherein said rail clamp is configured to be tightened to retain said rail.

4. The master cylinder of claim 1, wherein said master cylinder is configured on a brake circuit.

5. The master cylinder of claim 1, wherein said master cylinder is configured on a clutch circuit.

6. The master cylinder of claim 2, wherein said mounting bracket comprises a handlebar clamp comprising two opposing segments, wherein said rail clamp is configured on one of said opposing segments.

7. The master cylinder of claim 2, wherein said rail is integral with said master cylinder.

8. The master cylinder of claim 2, wherein said rail clamp comprises a bolt configured to tighten said rail clamp.

9. The master cylinder of claim 8, wherein said rail comprises a plurality of positioning cutouts on a surface of said rail, wherein said bolt is configured to be positioned within a positioning cutout when said rail clamp is secured to said rail.

10. The master cylinder of claim 1, wherein said master cylinder comprises a reservoir.

11. The master cylinder of claim 1 wherein said mounting bracket is configured for mounting on the handlebar by a handlebar clamp.

12. The master cylinder of claim 10, wherein said reservoir is positioned at a tilted angle relative to an upper surface of said master cylinder body.

13. A master cylinder for a hydraulic system, said master cylinder comprising:

A master cylinder body, said master cylinder body comprising a bore;

a lever operatively attached to said master cylinder body at a first end of said master cylinder body, a piston positioned within said bore and operatively connected to said lever such that when said lever is depressed said piston moves in a first direction away from said first end of said master cylinder body;

an outlet nut connected to a second end of said master cylinder body, wherein said outlet nut is configured for connection to a hydraulic line such that said hydraulic line is in fluid connection with said bore;

a spring positioned between said outlet nut and said piston and operatively connected to said piston such that said spring is configured to be compressed when said piston moves in said first direction when said lever is depressed, wherein said spring is configured to extend to return said piston in a second direction when pressure depressing said lever is released, wherein removal of said outlet nut allows for said spring to extend and provides access to said bore and said piston.

14. The master cylinder of claim 13, wherein said outlet nut comprises a shoulder configured as a seat for a first end of said spring.

* * * * *